No. 737,641. PATENTED SEPT. 1, 1903.
A. E. LOCKHART.
METALLIC BOX FOR BURIAL PURPOSES.
APPLICATION FILED APR. 2, 1900.
NO MODEL.

WITNESSES
C. H. Garnett
J. Murphy

INVENTOR
Albert E. Lockhart
by Jas. H. Churchill
Atty.

No. 737,641. Patented September 1, 1903.

UNITED STATES PATENT OFFICE.

ALBERT E. LOCKHART, OF CAMBRIDGE, MASSACHUSETTS.

METALLIC BOX FOR BURIAL PURPOSES.

SPECIFICATION forming part of Letters Patent No. 737,641, dated September 1, 1903.

Application filed April 2, 1900. Serial No. 11,110. (No model.)

*To all whom it may concern:*

Be it known that I, ALBERT E. LOCKHART, a citizen of the United States, residing in Cambridge, county of Middlesex, and State of Massachusetts, have invented an Improvement in Metallic Boxes, of which the following description, in connection with the accompanying drawings, is a specification, like letters on the drawings representing like parts.

This invention relates to a hermetically-sealed metallic box for burial purposes, and has for its object to provide a simple and efficient metallic box which is independent of the usual wooden or outside box and can be shipped independent thereof.

The metallic box is composed of sheet metal, which on account of cost and weight is made substantially thin, and in accordance with this invention the box is provided with a removable end, which is composed of a sheet-metal piece, which may be soldered or otherwise secured to a reinforcing structure, preferably an open frame, through which are inserted suitable screws, which enter threaded sockets in a reinforcing structure or open frame soldered or otherwise securely fastened, preferably, to the inner side of the body of the box. The box may be rendered air-tight by means of a rubber or other gasket interposed between the frame within the box and the removable end thereof. The removable end of the metallic box may and preferably will be secured to the body of the box by screws having handles pivoted thereto, so that the metallic box may be quickly and easily sealed without the aid of a screwdriver.

These and other features of this invention will be pointed out in the claims at the end of this specification.

Figure 1:
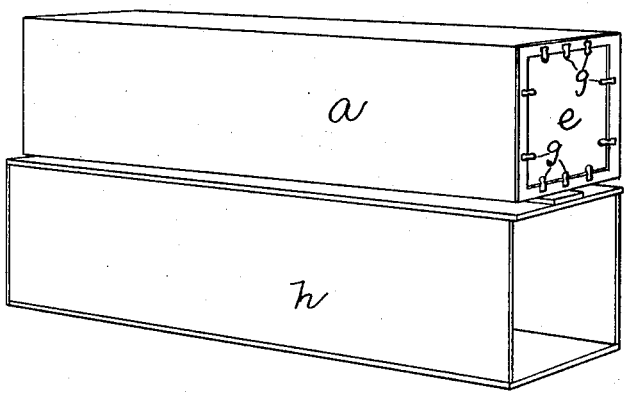
Figure 2:
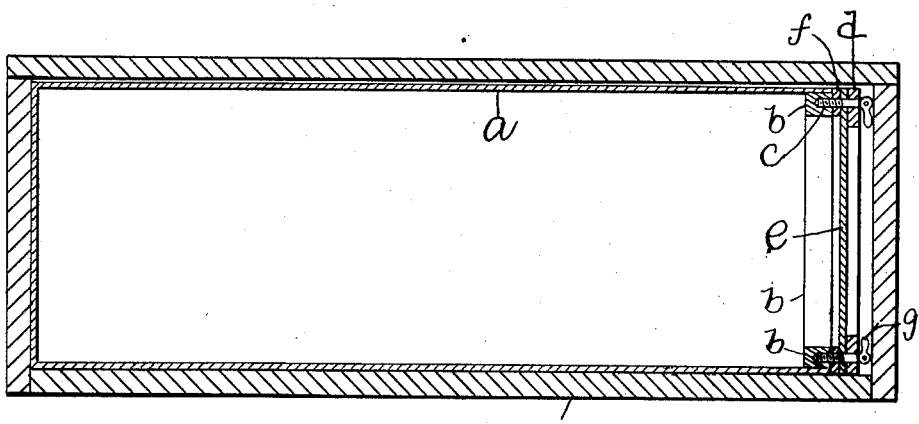

Figure 1 is a perspective view of a metallic box embodying this invention placed on top of the outer wooden box with which in practice it is used, and Fig. 2 a longitudinal section showing the metallic box within the outer wooden box.

The metallic box $a$, composed of sheet metal, may be of any suitable construction, and in accordance with this invention one end of the box is made removable and is adapted to be secured air-tight to the body of the box $a$. On account of weight and cost the metallic box $a$ is made of thin stock, and in order to secure the removable end to the body of said box the said body has soldered or otherwise secured, preferably, to its inner side at the normally open end of the box an open metal frame $b$, constituting one form of reinforcing structure and which is preferably soldered to the top, bottom, and sides of the box. The outer surface of the open frame $b$ is preferably flush with the end of the box-body and is provided with suitably-threaded sockets for the reception of screws $c$, which are inserted through a reinforcing structure or open frame $d$, to which the removable end plate $e$ of the box is soldered. The end plate $e$ is herein shown as soldered to the inner face of the open frame $d$, and between the end plate $e$ and the open frame $b$ is interposed a gasket or packing-strip $f$ of rubber or other suitable material, which effects an air-tight joint between the removable end of the box and the body thereof when the screws $c$ are turned up into their sockets. The gaskets $f$ may be cemented to the end plate $e$. The screws $c$ may and preferably will be provided with handles $g$, pivoted thereto, so that the said screws may be quickly turned in either direction without the necessity of a screwdriver or other tool, and when the removable end of the box has been secured air-tight to the body the handles may be turned into a position substantially parallel with the end plate $e$. The end plate $e$ is made equal to the sectional area of the box $a$, so that when secured in place its edges are substantially flush with the top, bottom, and sides of said box, whereby the hermetically-closed metallic box may be placed entirely within the wooden box $h$.

The end-out hermetically-sealed metallic box in practice is placed within the outer wooden box $h$, such as now commonly used, and by reason of the screw-handles being pivoted as described the outer box need be but little longer than the metallic box. The hermetically-sealed metallic box being independent of the outer wooden box enables a manufacturer to ship the metallic boxes to undertakers, who can fit them into their own outside boxes.

I prefer to make the metallic box with one end removable, as described; but I do not desire to limit my invention in this respect, as the top or side may be made removable in the same manner. While I prefer to use screws provided with handles, as herein shown, it is evident that screws of ordinary construction may be employed.

I claim—

1. The combination with a metal box open at one end and provided with an open reinforcing structure of substantial thickness within the box and substantially flush with the open end thereof and provided with screw-threaded sockets in its outer face, of a removable end for said box of a size substantially equal to the sectional area of said box, screws inserted through said end into the sockets in the reinforcing structure, and means to render said metal box air-tight at its removable end, substantially as described.

2. The combination with a metal box open at one end and provided with an open reinforcing structure $b$ on its inner side, of a removable end for said box, a reinforcing structure $d$ attached to the outside of said end, means to secure said end to the reinforcing structure attached to the box, and means interposed between said end and body of the box to render the same air-tight at its removable end, substantially as described.

In testimony whereof I have signed my name to this specification in the presence of two subscribing witnesses.

ALBERT E. LOCKHART.

Witnesses:
JAS. H. CHURCHILL,
J. MURPHY.